March 1, 1949.    R. R. GUNDERSON    2,463,173
FLUID PRESSURE INCREASING DEVICE
Filed July 25, 1947
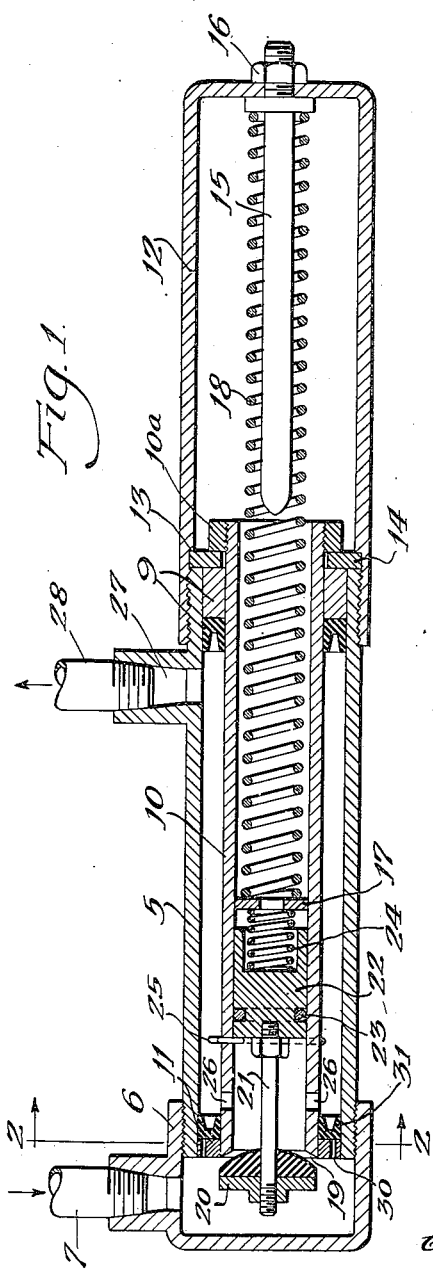
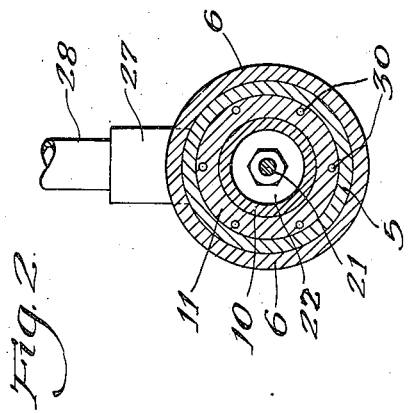
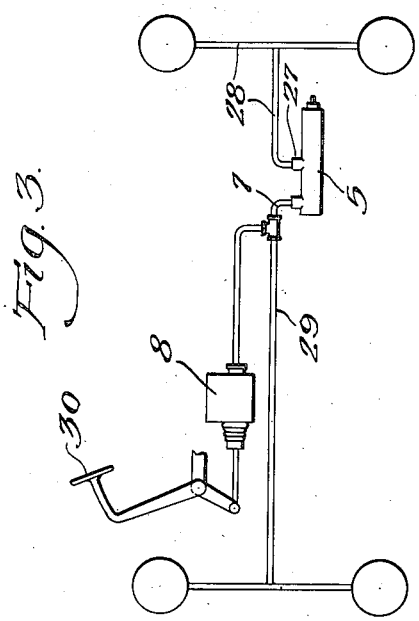
Inventor:
Ralph R. Gunderson
By Chritton, Schroeder, Merriam & Hofgren
Attorneys Patented Mar. 1, 1949

2,463,173

UNITED STATES PATENT OFFICE 2,463,173

FLUID PRESSURE INCREASING DEVICE

Ralph R. Gunderson, Chicago, Ill.

Application July 25, 1947, Serial No. 763,716

4 Claims. (Cl. 60—54.6)

This invention relates to fluid pressure increasing devices wherein the pressure is automatically raised, and more particularly to fluid pressure increasing devices adapted for use in connection with hydraulic brake systems.

The primary object of the invention is to provide a simple and reliable device for raising the fluid pressure in a line by use of a piston having a substantially greater effective area on the low pressure side than the effective area on the high pressure side.

Another object of the invention is to provide a fluid pressure increasing device wherein the slack in the brake system may be taken up directly by the pressure from the master cylinder, and the pressure will automatically be increased by continued application of pedal pressure after the slack is taken up.

In motor vehicles it is customary to use hydraulic brakes so that more braking pressure is applied to the front wheels than to the rear wheels. In trucks, particularly with trailers, it has been found that on slippery pavements the front wheels are likely to skid before the brakes are exerting their maximum force on the rear wheels, and as a result the driver is apt to lose control of the vehicle. To overcome this difficulty, some drivers disconnect the front brakes from the hydraulic system when the roads are slippery. By the present invention more pressure will be applied to the rear brakes than the front brakes.

The present device is an improvement over the device shown in my Patent No. 2,408,513, patented October 1, 1946.

The invention is illustrated in a preferred embodiment in the accompanying drawings, in which—

Fig. 1 is a longitudinal sectional view of a device embodying the invention; Fig. 2, a sectional view, taken as indicated at line 2—2 of Fig. 1; and Fig. 3, a diagrammatic view showing how the device may be used in a brake system to apply more pressure to the rear wheels than the front wheels.

In the embodiment illustrated, a cylinder 5 is provided at its front end with a closure cap 6 having a fluid port 7 which may be connected to the pedal actuated master cylinder 8 of a brake system. The rear portion of the cylinder is provided with a packing ring seal 9, which serves as a cylinder of smaller diameter than the cylinder 5. A hollow piston rod 10 extends through the packing ring 9 and is provided at its front end with a piston head 11. A nut 10ᵃ serves as a stop to limit the forward travel of the piston rod 10.

A tubular closure cap 12 is threaded to the rear portion of the cylinder 5, and has a shoulder 13 which clamps a washer 14 against the end of the cylinder. A guide rod 15 is secured to the end of the cap by a nut 16 and extends into the piston rod 10. The piston rod is provided with a perforated stop wall 17 which is fixed within the rod, and a compression spring 18 is provided around the guide rod 15 and bears against the wall 17, so as to urge the piston rod forwardly in the cylinder 5.

The front end of the piston rod affords a valve seat 19 for a valve head 20 provided with a rearwardly extending push rod 21 which is secured at its rear end to a plunger 22. The plunger has a packing ring 23 and a compression spring 24 urges the plunger forwardly against a stop 25 provided in the piston rod. The piston rod is provided with ports 26, in rear of the piston head 11 and the front of the stop 25, so that the inner front portion of the piston rod is always in communication with the inner rear portion of the cylinder 5.

A fluid port 27 is provided in the cylinder 5, in rear of the end of travel of the piston head 11. As shown in Fig. 3, this port may be connected by piping 28 to the rear wheel brakes of the truck. By piping 29 the front wheel brakes are kept in communication with the master cylinder and fluid port 7.

In operation, a foot pedal 30 is depressed to operate the master cylinder and apply pressure to the front wheel brakes. At the same time fluid passes through the port 7, around the piston rod valve head 20 through ports 26 and out through port 27 to the piping connected to the rear wheel brakes. When the pressure reaches a certain set point, the plunger 22 moves against the pressure of the spring 24 and closes the valve. Continued application of pressure from the master cylinder will then cause the piston rod and head to move to the right, as viewed in Fig. 1, and as the effective area in rear of the piston head 11 is greater than the rear of the piston head, a greater pressure will be applied to the pipes 28 than to the pipes 29. This will cause the rear brakes to be applied with greater pressure than the front brakes. When pressure on the foot pedal is released, the spring 18 will cause the piston head to move back to the position shown in Fig. 1, and the spring 24 will cause the valve to open so that fluid can return through the piston rod to the port 7. As shown in Figs.

1 and 2, small holes 30 may be provided in the piston head and are normally closed by a packing 31. In normal operation these holes always remain closed. However, if pressure on the master cylinder side should exceed the pressure on the secondary side, due to any abnormal condition, the pressure will be equalized by those holes.

In the drawings the plunger 22 has been shown as a piston, but it will be understood that a diaphragm may be substituted, if desired, because the movement is relatively small.

The foregoing detailed description is given for clearness of understanding only, and no unnecessary limitations should be understood therefrom, for some modifications will be obvious to those skilled in the art.

I claim:

1. A fluid pressure increasing device comprising: a cylinder member provided at its rear portion with a packing ring seal; a hollow piston rod extending through said packing ring and having a piston head at its front end; a compression spring urging said piston rod forwardly; a valve in the front end of the piston rod and provided with a valve operating plunger in said piston rod; a spring urging said valve to open position; a port in the piston rod between the piston head and said plunger; a fluid port in said cylinder in front of one end of the travel of said piston head; and another fluid port in the cylinder in rear of the other end of the travel of the piston head.

2. A device as specified in claim 1, in which a pair of stops are provided within the hollow piston rod to limit the travel of the plunger in the piston rod.

3. A device as specified in claim 1, in which a stop is provided in the hollow piston rod and both springs bear against said stop from opposite directions.

4. A device as specified in claim 1, in which a removable tubular closure cap is provided on rear of the cylinder; a guide rod is fixed on the end of said cap and extends into the piston rod, and the compression spring bears against the end of the cap and against a stop fixed within said piston ring.

RALPH R. GUNDERSON.

No references cited.